(12) United States Patent
Hattori

(10) Patent No.: US 8,326,052 B2
(45) Date of Patent: Dec. 4, 2012

(54) APPARATUS, METHOD, AND COMPUTER-READABLE STORAGE MEDIUM FOR DECODING MOVIE IMAGE DATA

(75) Inventor: Hideaki Hattori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 723 days.

(21) Appl. No.: 12/468,207

(22) Filed: May 19, 2009

(65) Prior Publication Data

US 2009/0290805 A1 Nov. 26, 2009

(30) Foreign Application Priority Data

May 23, 2008 (JP) .................................. 2008-135682

(51) Int. Cl.
*G06K 9/36* (2006.01)
*G06K 9/46* (2006.01)
(52) U.S. Cl. ..................... 382/232; 382/233; 375/240.29
(58) Field of Classification Search .................. None
See application file for complete search history.

(56) References Cited

U.S. PATENT DOCUMENTS

| | | | | |
|---|---|---|---|---|
| 6,240,135 B1* | 5/2001 | Kim | .......................... | 375/240.01 |
| 2004/0008787 A1* | 1/2004 | Pun et al. | .................. | 375/240.25 |
| 2004/0062310 A1* | 4/2004 | Xue et al. | .................. | 375/240.16 |
| 2004/0101059 A1* | 5/2004 | Joch et al. | ................. | 375/240.29 |
| 2004/0228415 A1* | 11/2004 | Wang | ......................... | 375/240.29 |
| 2006/0008013 A1* | 1/2006 | Pelc et al. | ................. | 375/240.29 |
| 2006/0268985 A1* | 11/2006 | Liang et al. | .............. | 375/240.16 |
| 2007/0189735 A1* | 8/2007 | Kawashima et al. | ......... | 386/112 |
| 2008/0043853 A1 | 2/2008 | Kawa | | |
| 2008/0137752 A1* | 6/2008 | He | .......................... | 375/240.24 |
| 2008/0159404 A1* | 7/2008 | Hong et al. | .............. | 375/240.23 |
| 2008/0298472 A1* | 12/2008 | Jain et al. | .................. | 375/240.29 |
| 2009/0052555 A1* | 2/2009 | Mak-Fan et al. | ......... | 375/240.29 |

FOREIGN PATENT DOCUMENTS

| | | |
|---|---|---|
| JP | 63-199589 A | 8/1988 |
| JP | 09-009254 A | 1/1997 |
| JP | 2000-050275 A | 2/2000 |
| JP | 2003-224797 A | 8/2003 |
| JP | 2004-336705 A | 11/2004 |
| JP | 2007-129369 A | 5/2007 |
| JP | 2008-48181 A | 2/2008 |

* cited by examiner

*Primary Examiner* — Li Liu

(74) *Attorney, Agent, or Firm* — Canon USA Inc. IP Division

(57) ABSTRACT

A selector selects one of a standard parameter corresponding to a filter strength contained in input movie image data and an original parameter originally set at the decoding side as a filter parameter to be used. A screen-display filter performs deblocking filtering using the filter parameter selected by the selector on decoded movie image data. A post-filter performs deblocking filtering using the standard parameter and stores the obtained decoded image data in a memory to allow it to be used in inter-frame compensation.

10 Claims, 12 Drawing Sheets

APPARATUS, METHOD, AND COMPUTER-READABLE STORAGE MEDIUM FOR DECODING MOVIE IMAGE DATA

BACKGROUND OF THE INVENTION

1. Field of the Invention

The present invention relates to a technique for decoding encoded movie image data and, more specifically, compensation for excess or deficiency of filtering.

2. Description of the Related Art

There are techniques for encoding (compressing) and decoding (decompressing) movie image data to efficiently store and transmit digital images having an enormous amount of data. In Japan, as well as other countries, various encoding systems, including the motion picture experts group phase 2 (MPEG-2) used in digital terrestrial television broadcasting and H.264 standardized by the international telecommunication union telecommunication standardization sector (ITU-T), are used.

In particular, in encoding systems, such as H.264 and the audio video coding standard (AVS), post-filtering (deblocking filtering) is performed in order to eliminate block distortion caused by, for example, quantization executed during encoding of an image. Deblocking filtering (also known as smoothing filtering) is filtering for smoothing pixel values of pixels at a boundary of blocks into which a frame is divided, in accordance with a filter strength set in encoding.

For example, Japanese Patent Laid-Open No. 2008-048181 describes a technique for reducing block distortion by changing pixel values across an edge of blocks into which movie image data is divided through horizontal and vertical deblocking filtering.

However, depending on the filter strength of a smoothing filter set at the encoding side, an excessive removal of a high-frequency component of an image by filtering may result in image blurring, or filtering may be unable to offer sufficient advantages.

One such example case is the case where a user sets the filter strength for use in deblocking filtering higher than necessary in obtaining a movie image although there is no need of deblocking filtering (block distortion does not occur). In this case, if deblocking filtering is performed in accordance with the filter strength set in obtaining an image, a high-frequency component of the image would be excessively removed, resulting in the occurrence of image blurring.

SUMMARY OF THE INVENTION

An embodiment of the present invention provides compensation for excess or deficiency of filtering resulting from the filter strength of a smoothing filter set at the encoding side.

According to an aspect of the present invention, a decoding apparatus for decoding encoded first frame data and decoding encoded second frame data on the basis of difference information indicating a difference between the first frame data subjected to smoothing using a first parameter and unsmoothed second frame data is provided. The decoding apparatus includes a decoding unit, a first smoothing unit, and a second smoothing unit. The decoding unit is configured to decode the encoded first frame data. The first smoothing unit is configured to, when the decoding apparatus sets a second parameter, perform smoothing using the second parameter on the first frame data decoded by the decoding unit and output the smoothed first frame data as reproduction first frame data to be reproduced for displaying. The second smoothing unit is configured to perform smoothing using the first parameter on the first frame data decoded by the decoding unit and output the smoothed first frame data as reference first frame data for use in reference in decoding the encoded second frame data. The decoding unit is configured to refer to the reference first frame data, which is obtained by smoothing using the first parameter performed by the second smoothing unit, and decode the encoded second frame data on the basis of the difference information indicating the difference between the first frame data subjected to smoothing using the first parameter and the unsmoothed second frame data.

Further features of the present invention will become apparent from the following description of exemplary embodiments (with reference to the attached drawings).

DESCRIPTION OF THE EMBODIMENTS

Figure 1:
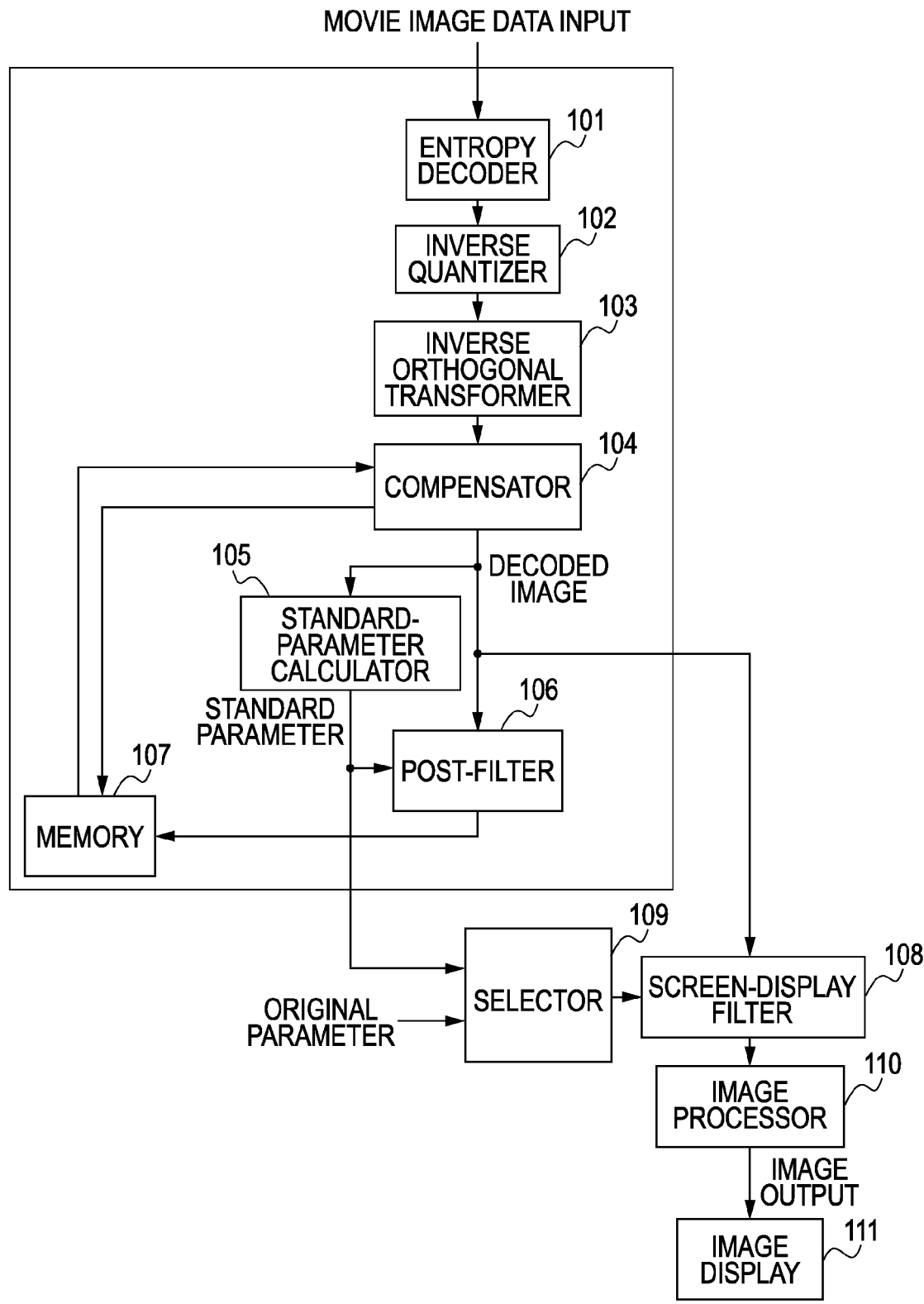
FIG. 1 is a block diagram that illustrates a decoding apparatus according to a first embodiment of the present invention.

FIG. 1 illustrates an example configuration of a decoding apparatus according to a first embodiment of the present invention in the form of a block diagram. The decoding apparatus according to the present embodiment is a decoding apparatus that decodes frame data constituting movie image data and may be contained in a digital television, for example. The present invention can also be an apparatus for decoding frame data constituting movie image data contained in a device other than a digital television, such as a personal computer, a work station, a notebook personal computer (PC), a palmtop PC, a decoder, a household electrical appliance installing a computer, a game machine, and a cellular phone, and alternatively, can also be any combination of decoding apparatuses of devices selected from the above-mentioned example devices.

The decoding apparatus illustrated in FIG. 1 includes an entropy decoder 101, an inverse quantizer 102, an inverse orthogonal transformer 103, a compensator 104, a standard-parameter calculator 105, a post-filter 106, and a memory 107. The decoding apparatus illustrated in FIG. 1 further includes a screen-display filter 108, a selector 109, an image processor 110, and an image display 111. The standard-parameter calculator 105 calculates a standard parameter being a filter parameter that is for use in deblocking filtering and that conforms to a standardized encoding system (e.g., H.264). The details will be described below.

The entropy decoder 101 receives encoded movie image data and performs variable-length decoding or arithmetical decoding on the received movie image data. Movie image data input into the entropy decoder 101 may be an image stream distributed through streaming, and alternatively, may also be image data recorded on a recording medium. The entropy decoder 101 obtains an encoding parameter, such as a motion vector, a quantization scale value, a macroblock type, and a filter strength for use in a deblocking filter, and a quantized orthogonal transform coefficient from the input movie image data and outputs them to the inverse quantizer 102. In the present embodiment, the encoding parameter is output to the inverse quantizer 102 together with the quantized orthogonal transform coefficient. Alternatively, the encoding parameter may also be transmitted through a route different from a route for the orthogonal transform coefficient so as to be in time for processing at a later stage.

The inverse quantizer 102 performs inverse quantization on the quantized orthogonal transform coefficient input from the entropy decoder 101 using the quantization scale value and outputs the processed orthogonal transform coefficient to the inverse orthogonal transformer 103. The inverse orthogonal transformer 103 performs inverse orthogonal transform (integer transform) on the input orthogonal transform coefficient and thus generates a prediction error block, and outputs the prediction error block to the compensator 104.

The compensator 104 determines whether data corresponding to the prediction error block input from the inverse orthogonal transformer 103 is a macroblock subjected to intra-frame prediction or a macroblock subjected to inter-frame prediction by, for example, referring to information indicating the macroblock type. The macroblock used here indicates a block consisting of 16×16 pixels. The compensator 104 performs either one of intra-frame compensation and inter-frame compensation depending on the determination.

In intra-frame compensation, the compensator 104 reads reference pixels for use in intra-frame compensation (hereinafter referred to as intra-frame compensation reference pixels) from the memory 107 and generates a reference block for use in intra-frame compensation (hereinafter referred to as an intra-frame compensation reference block) conforming to the intra-frame prediction mode. The intra-frame compensation reference pixels are pixel data of a block before deblocking filtering is performed on a decoded image in the same frame. The compensator 104 adds the generated intra-frame compensation reference block and a prediction error block being an output from the inverse orthogonal transformer 103 together and thus obtains compensated decoded image data. The compensator 104 outputs the obtained decoded image data to the standard-parameter calculator 105, the post-filter 106, and the screen-display filter 108. The compensator 104 causes the memory 107 to store the compensated decoded image data to allow it to be used in intra-frame compensation.

In inter-frame compensation, the compensator 104 reads reference pixels for use in inter-frame compensation (hereinafter referred to as inter-frame compensation reference pixels) from the memory 107 and generates a reference block for use in inter-frame compensation (hereinafter referred to as an inter-frame compensation reference block) according to the motion vector and the encoding mode. The inter-frame compensation reference pixels are pixel data of a block in which deblocking filtering is performed on a decoded image in frames having different reproduction times.

The compensator 104 adds the generated inter-frame compensation reference block and a prediction error block being an output from the inverse orthogonal transformer 103 together and thus obtains compensated decoded image data. The compensator 104 outputs the obtained compensated decoded image data to the standard-parameter calculator 105, the post-filter 106, and the screen-display filter 108. The compensator 104 causes the memory 107 to store the compensated decoded image data as the intra-frame compensation reference pixel.

In H.264, frame data (e.g., a macroblock in a frame) can be encoded using difference information indicating the difference from reference frame data (e.g., a macroblock in another frame). In such a case, the reference frame data is frame data subjected to deblocking filtering using the standard parameter being a filter parameter conforming to the encoding system. The decoding apparatus decodes the above-described frame data using information indicating the difference between the reference frame data subjected to deblocking filtering using the standard parameter and the frame data generated in encoding and being a target of decoding.

That is, a part from the entropy decoder 101 to the compensator 104 in the present embodiment constitutes a unit configured to decode encoded first frame data. Also, a part from the entropy decoder 101 to the compensator 104 in the present embodiment constitutes a unit configured to decode encoded second frame data on the basis of information indicating the difference between first frame data smoothed using a first parameter and second unsmoothed frame data. The first parameter indicates the standard parameter, the first frame data indicates the reference frame data, and smoothing indicates filtering.

The standard-parameter calculator 105 and the post-filter 106 perform post-filtering (deblocking filtering) on the compensated decoded image data output from the compensator 104.

The standard-parameter calculator 105 calculate a filter parameter for each macroblock using the decoded image data subjected to intra/inter-frame compensation and the filter strength (including execution and non-execution of filtering) contained in the movie image data received from the compensator 104. The filter parameter calculated by the standard-parameter calculator 105 is a filter parameter that conforms to a standardized encoding system (e.g., H.264) and that is for use in deblocking filtering (standard parameter). In other words, the standard parameter is determined by the filter strength contained in movie image data input into the decoding apparatus and information for each macroblock, and the standard parameter is not changed by the decoding apparatus.

The standard-parameter calculator 105 outputs the calculated standard parameter to the post-filter 106 and the selector 109, which will be described below. In such a manner, deblocking filtering is performed on a macroblock basis in the present embodiment. Alternatively, filtering may also be performed on another basis (e.g., in units of 4×4 pixels) other than a macroblock basis. In other words, the standard-parameter calculator 105 can calculate a filter parameter in units in filtering (e.g., 4×4 pixels).

The post-filter 106 performs deblocking filtering on the compensated decoded image data received from the compensator 104 using the standard parameter received from the standard-parameter calculator 105.

One example of deblocking filtering is processing for smoothing pixel values of pixels at a boundary in the vertical direction of a macroblock in accordance with pixel values of neighboring pixels lying across the boundary. In this processing, for example, the value obtained by dividing by six the sum of a weighted value in which a pixel value being an output in filtering is multiplied by four and an unweighted value of a pixel value of each of neighboring pixels lying at right and left sides is a pixel value after filtering. The degree of weighting for a pixel and the number of pixels used in filtering vary with the filter strength or other factors. The post-filter 106 causes the memory 107 to store decoded image data in which block distortion is reduced to allow it to be used for inter-frame compensation.

The post-filter 106 smoothes (filters) first frame data (decoded image data) decoded through the entropy decoder 101 to the compensator 104, using the first parameter (standard parameter). Then, the post-filter 106 outputs, to the memory 107, the reference first frame data for use in reference in decoding the encoded second frame data (image data in a frame that is to be decoded later).

The post-filter 106 smoothes pixel information for pixels at a boundary between a plurality of blocks (macroblocks) constituting the first frame data (decoded image data).

In FIG. 1, the memory 107 stores both of a reference pixel for use in inter-frame compensation and that for use in intra-frame compensation. However, this memory is not necessarily required to be a single memory. The decoding apparatus can have different memories for use in inter-frame compensation and intra-frame compensation. The same applies to the embodiments described below.

The selector 109 selects either one of the standard parameter received from the standard-parameter calculator 105 and an original parameter set in the decoding apparatus and outputs the selected filter parameter to the screen-display filter 108. A method for selecting a filter parameter for use in the selector 109 will be described below.

The screen-display filter 108 performs deblocking filtering on the decoded image data received from the compensator 104 using the filter parameter selected by the selector 109 and outputs the decoded image data subjected to filtering to the image processor 110. When the standard parameter is selected, the output of the post-filter 106 and the output of the screen-display filter 108 are the same.

The image processor 110 performs image processing, such as color-space transform and filtering for improving the image quality, on the decoded image data subjected to filtering received from the screen-display filter 108 and outputs the processed data to the image display 111. The image display 111 displays the decoded image data subjected to image processing received from the image processor 110. In such a way, when the selector 109 selects the standard parameter output from the standard-parameter calculator 105, decoded image data conforming to the standard encoding system is displayed. In contrast, when the selector 109 selects the original parameter, decoded image data subjected to deblocking filtering in accordance with the original parameter is displayed.

When a second parameter is set in the decoding apparatus, the screen-display filter 108 smoothes first frame data decoded through the entropy decoder 101 to the compensator 104, using the second parameter, and outputs reproduction first frame data to be reproduced. The second parameter used here indicates an original parameter, and smoothing indicates filtering.

The screen-display filter 108 smoothes pixel information for pixels at a boundary between a plurality of blocks (macroblocks) constituting the first frame data (decoded image data).

In such a way, the decoding apparatus according to the present embodiment includes two filters: the post-filter 106 for performing filtering to obtain decoded image data for inter-frame compensation and the screen-display filter 108 for performing filtering to obtain decoded image data to be displayed.

The reason why the decoding apparatus includes two filters is described below. To prevent image blurring caused by deblocking filtering, one possible approach is to decrease the filter strength set in encoding (or to set filtering such that it will not be performed) in the decoding apparatus. However, in an encoding system such as H.264, for example, data of a frame subjected to deblocking filtering is used as data for use in inter-frame compensation to decode data of another frame. That is, encoding is performed such that the filter parameter is determined according to the filter strength on the basis of the difference value between data being a target for encoding (e.g., a macroblock) and the reference data subjected to deblocking filtering. Thus, if the filter strength is changed in a traditional decoding apparatus, data of a frame subjected to filtering using the changed filter strength is referred to in decoding data of another frame. For example, if the setting is changed during decoding such that filtering will not be performed, data that is not subjected to filtering is undesirably used as the reference data in decoding. Once the setting has been changed such that filtering will not be performed, even if the setting is reset such that filtering will be performed, data that is not subjected to filtering is referred to thereafter. Accordingly, for example, even a frame that is not inter-frame compensated may be unable to be converted back into an image conforming to the standard mode. In other words, even if the filter strength changed once during decoding is reset, it may take much time to obtain an image conforming to the standard mode.

The decoding apparatus according to the present embodiment includes two filters of the post-filter 106 for performing filtering to obtain decoded image data for use in inter-frame compensation and the screen-display filter 108 for performing filtering to obtain decoded image data to be displayed. In such a way, the decoded image data for use in inter-frame compensation can be prevented from being changed by the changing of the filter strength.

Next, a process performed in the portions of the decoding apparatus according to the present embodiment from when movie image data is input into the entropy decoder 101 to when the movie image data is displayed on the image display 111 is described with reference to the flowchart illustrated in FIG. 7.

In the present embodiment, processing in each of the portions described using FIG. 1 is performed by hardware. Alternatively, the processing can also be performed by software. That is, a central processing unit (CPU) controlling the decoding apparatus can carry out the functions of each portion illustrated in FIG. 1 by reading a control program stored in computer-readable storage medium, for example, a read-only memory (ROM) to a memory used to execute the program (e.g., a random-access memory (RAM)) and performing processing. FIG. 7 and the description below correspond to steps of processing in the decoding apparatus according to the present embodiment when the processing is carried out by software. In the present embodiment, a series of steps performed on a macroblock basis is described by way of example. However, as previously described, the steps may also be performed on another basis.

In step S701, the entropy decoder 101 receives encoded movie image data. The movie image data may be received through any process. For example, the movie image data may be read from the memory, or alternatively, may also be directly input from an interface.

In step S702, the entropy decoder 101 decodes the encoded movie image data received in step S701 and thus obtains desired data. More specifically, in step S703, the entropy decoder 101 obtains, from the encoded movie image data, an encoding parameter, such as a macroblock type, a motion vector, a quantization scale value, and a filter strength for use in a deblocking filter. In step S704, the entropy decoder 101 obtains quantized orthogonal transform coefficient from the encoded movie image data. The data obtained in steps S703 and S704 is output to the inverse quantizer 102.

In step S705, the inverse quantizer 102 performs inverse quantization with the quantized orthogonal transform coefficient using the quantization scale value received from the entropy decoder 101. In step S705, the inverse orthogonal transformer 103 performs inverse orthogonal transform, such as inverse integer transform or inverse discrete cosine transform (IDCT), in units of 4×4 pixels or 8×8 pixels.

In step S706, the compensator 104 performs inter/intra-frame compensation and thus obtains decoded image data. That is, encoded first frame data is decoded through steps S702 to S706 (decoding step).

Figure 7:
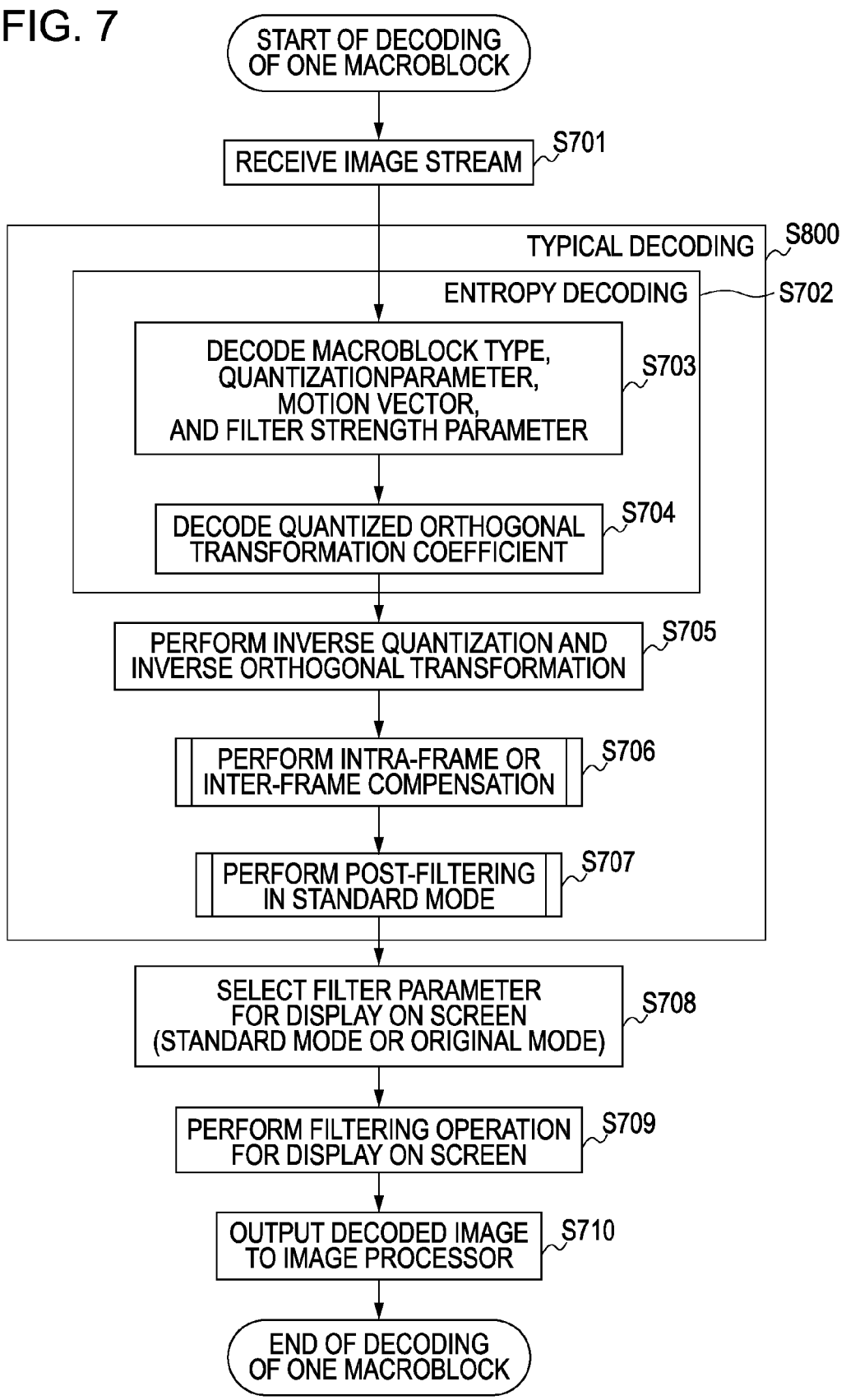
FIG. 7 is a flowchart that illustrates an operation of the decoding apparatus according to the first embodiment.
Figure 8:
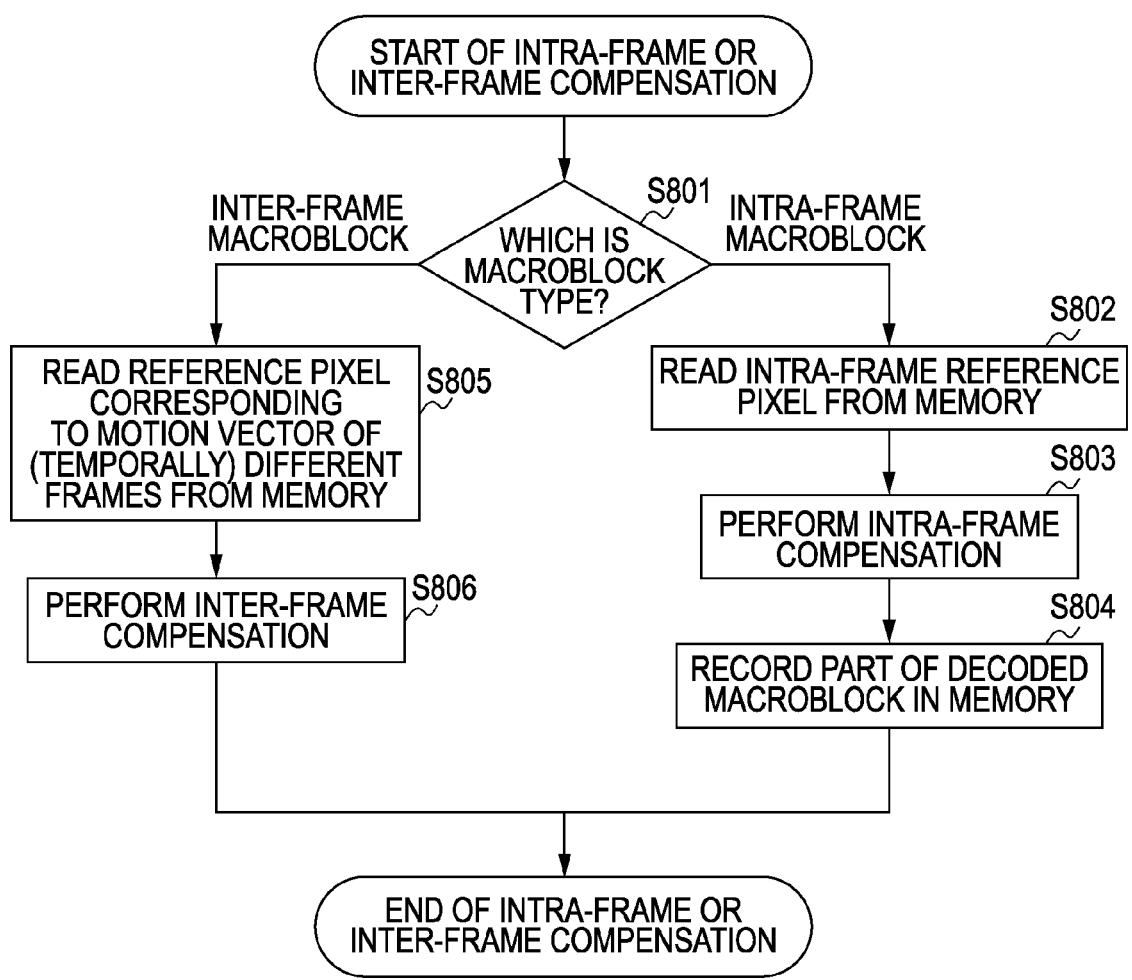
FIG. 8 is a flowchart that illustrates an intra/inter frame compensation process.

The details of step S706 are described using FIG. 8. FIG. 8 is a flowchart that corresponds to compensation performed by the compensator 104 in step S706 illustrated in FIG. 7. In step S801, the compensator 104 refers to the macroblock type obtained in the entropy decoder 101 and determines whether the image data (macroblock) to be compensated for is an intra-predicated macroblock or an inter-predicated macroblock. When the compensator 104 determines that it is an intra-predicated macroblock, flow proceeds to step S802. In step S802, the compensator 104 reads a group of intra-frame compensation reference pixels from the memory 107, and flow proceeds to step S803. In step S803, the compensator 104 generates an intra-frame compensation reference block in accordance with the intra-frame prediction mode from the group of intra-frame compensation reference pixels read in step S802. The compensator 104 adds the generated intra-frame compensation reference block and the prediction error block output from the inverse orthogonal transformer 103 in step S705 illustrated in FIG. 7 together and thus obtains decoded image data. In step S804, the compensator 104 stores the decoded image data obtained in step S803 in the memory 107 as that for use in intra-frame prediction for image data to be compensated for later.

In step S801, when the compensator 104 determines that the image data (macroblock) to be compensated for is an inter-predicated macroblock, flow proceeds to step S805. In step S805, the compensator 104 reads a group of reference pixels corresponding to information on the motion vector obtained in step S703 illustrated in FIG. 7 from the memory 107 as inter-frame compensation reference pixels, and flow proceeds to step S806. The inter-frame compensation reference pixels are pixel data of a block in which deblocking filtering is performed on a decoded image of frames having different reproduction times.

In step S806, the compensator 104 generates an inter-frame compensation reference block according to the motion vector and the encoding mode from the group of inter-frame compensation reference pixels read in step S805. The compensator 104 adds the generated inter-frame compensation reference block and the prediction error block output from the inverse orthogonal transformer 103 in step S705 illustrated in FIG. 7 together and thus obtains decoded image data. The compensator 104 stores the decoded image data in the memory 107 as that for use in intra-frame prediction of image data to be compensated for later.

That is, the compensator 104 performs intra-frame compensation in step S803 in accordance with an intra-frame compensation reference pixel stored in the memory 107. The compensator 104 performs inter-frame compensation in step S806 in accordance with an intra-frame compensation reference pixel stored in the memory 107. As previously described, the intra-frame compensation reference pixel is pixel data of a block before deblocking filtering is performed, and the inter-frame compensation reference pixel is pixel data of a block in which deblocking filtering is performed using the standard parameter. The compensator 104 outputs the decoded image data to the standard-parameter calculator 105, the post-filter 106, the screen-display filter 108, and the memory 107.

In other words, the compensator 104 decodes encoded image data (second frame data) in step S805 in the way described below. The compensator 104 refers to the reference first frame data smoothed using the standard parameter (first parameter). The second frame data has been encoded on the basis of information indicating the difference between the image data (the first frame data) subjected to smoothing (filtering) using the first parameter and unsmoothed second frame data. The compensator 104 decodes the second frame data encoded in this way in the manner described above. Smoothing used here indicates filtering.

Figure 9:
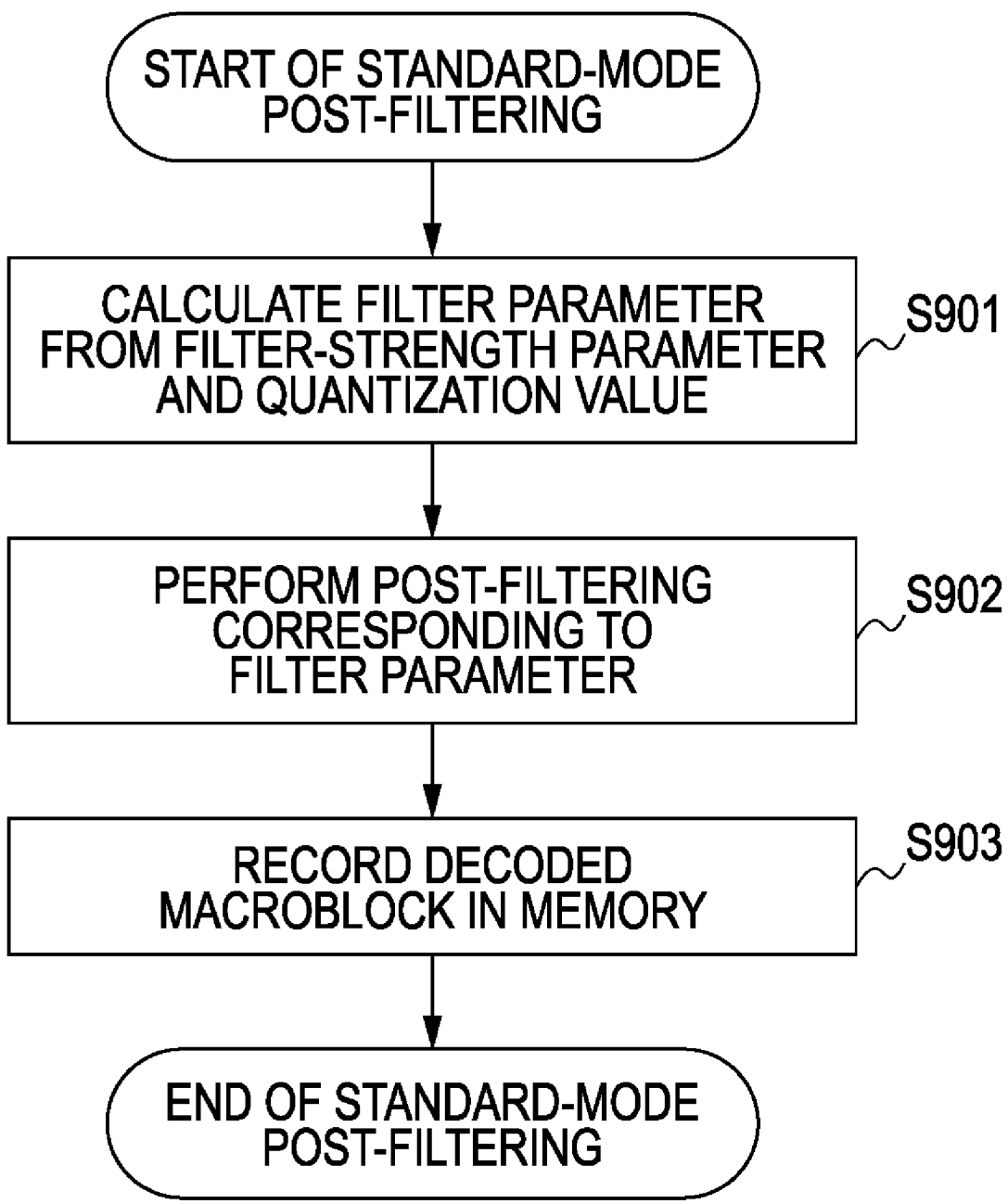
FIG. 9 is a flowchart that illustrates a post-filtering process in the standard mode.

In step S707 illustrated in FIG. 7 (second smoothing step), the standard-parameter calculator 105 and the post-filter 106 perform deblocking filtering. The details of step S707 are described with reference to FIG. 9. FIG. 9 is a flowchart corresponding to deblocking filtering performed by the standard-parameter calculator 105 and the post-filter 106 in step S707 illustrated in FIG. 7. In step S901, the standard-parameter calculator 105 calculates a standard parameter using the decoded image data and the filter strength received from the compensator 104. The standard parameter is a filter parameter that is for use in a deblocking filter and that conforms to the standard encoding system. The filter strength is contained in the movie image data.

The standard-parameter calculator 105 outputs the calculated standard parameter to the post-filter 106 and the selector 109. The post-filter 106 performs deblocking filtering on the decoded image data using the standard parameter received from the standard-parameter calculator 105. This processing corresponds to step S902. Then in step S903, the post-filter 106 causes the memory 107 to store the decoded image data subjected to filtering to allow it to be used in inter-frame compensation.

That is, in step S707 illustrated in FIG. 7, the post-filter 106 smoothes (performs filtering on) the decoded image data (first frame data) using the first parameter (standard parameter) calculated by the standard-parameter calculator 105 and outputs, to the memory 107, reference first frame data for use in reference in decoding image data to be displayed later (second frame data). The processing of steps S702 to S707 indicates a typical decoding process (S800).

In step S708, the selector 109 selects one of the standard parameter and the original parameter as the filter parameter to be output to the screen-display filter 108 in accordance with the standard parameter output by the standard-parameter calculator 105 and the decoded image data.

One example in which the selector 109 selects the original parameter set in the decoding apparatus is the case where it is determined that the standard parameter exceeds a preset threshold value. When a significantly high filter strength is set, the selector 109 determines that a high-frequency component would be excessively decreased. Then, the selector 109 selects the original parameter such that the filter strength associated with the original parameter is lower than that associated with the standard parameter and outputs it to the screen-display filter 108. In contrast, the selector 109 can also select the original parameter when the standard parameter is smaller than a preset threshold value. When a significantly low filter strength is set (or it is set such that filtering will not be performed), the selector 109 determines that block distortion would occur. Then, the selector 109 selects the original parameter such that the filter strength associated with the original parameter is higher than that associated with the standard parameter and outputs it to the screen-display filter 108.

Another example case in which the selector 109 selects the original parameter is the case where there are many frames encoded using intra-frame prediction because of the ease of editing. This is because, in H.264, intra-frame predicted image data is encoded such that greater advantages brought by deblocking filtering are obtainable. In such a case, the selector 109 selects the original parameter such that the filter strength associated with the original parameter is lower than that associated with the standard parameter and outputs it to the screen-display filter 108. In contrast, when it is determined that there are many frames encoded using inter-frame prediction, the selector 109 may select the original parameter such that the filter strength associated therewith is increased.

Still another example case in which the selector 109 selects the original parameter is the case where movie image data having a significantly large high-frequency component (e.g., a movie image of a forest having dead leaves mixed therein) is input. In such a case, the selector 109 determines that degradation in the image quality in image blurring would be subjectively more noticeable than that in block distortion, selects the original parameter to have a filter strength lower than the standard parameter, and outputs it to the screen-display filter 108. In contrast, when it is determined that a high-frequency component is small, the selector 109 may select the original parameter such that the filter strength is increased.

For example, the selector 109 refers to a change in pixel information within a decoded macroblock. Then, when the change in the pixel information is large, the original parameter is set such that the filter strength is reduced.

The selector 109 according to the present embodiment selects the original parameter when the above-described movie image data is input, so greater advantages of improving the subjective image quality brought by reduction in image blurring are obtainable.

Examples of the standard parameter and the original parameter are described here. It is assumed that the standard parameter is a parameter setting the value obtained by dividing by three the sum of a pixel value of a pixel that is a target for deblocking filtering and a pixel value of each of left and right pixels adjacent to the target pixel as the pixel value after filtering. One example of the original parameter enabling the filter strength associated therewith to be lower than the filter strength associated with that standard parameter is discussed below. One example of the original parameter is a parameter setting the value obtained by dividing by six the sum of a weighted pixel value in which a pixel value of a pixel being a target for deblocking filtering is multiplied by four and a pixel value of neighboring left and right pixel values as the pixel value after filtering. In such a case, when the original parameter is selected and filtering is performed using that original parameter, compared with when filtering is performed using the standard parameter, the effect of the original pixel value of a pixel being a target for filtering can remain more largely. Accordingly, a high-frequency component can be prevented from being excessively removed.

Other examples of the standard parameter and the original parameter are described below. For example, it is assumed that the standard parameter is a parameter setting the value obtained by dividing by five the sum of a pixel value of a pixel being a target for filtering and pixel values of two pixels left to the target pixel and two pixels right to the target pixel as the pixel value after filtering. One example of the original parameter enabling the filter strength associated therewith to be lower than the filter strength associated with the standard parameter is a parameter setting the value obtained by dividing by three the sum of a pixel value of a pixel being a target for deblocking filtering and pixel values of one pixel left to the target pixel and one pixel right to the target pixel as the pixel value after filtering. In such a case, when the original parameter is selected and filtering is performed using that original parameter, compared with when filtering is performed using the standard parameter, the effect of the original pixel value of a pixel being a target for filtering can remain more largely. Accordingly, a high-frequency component can be prevented from being excessively removed.

In such a manner, the strength of a filter can be changed by changing the number of pixels for use in deblocking filtering (range) and the degree of weighting a pixel value to be added.

The original parameter according to the present embodiment may be set such that the filter strength associated therewith is higher or lower than the filter strength associated with the standard parameter calculated by and received from the standard-parameter calculator 105 after the standard parameter is received. Alternatively, the original parameter may be a filter parameter according to a preset filter strength.

In the present embodiment, either one of the standard parameter and the original parameter is selected in accordance with the standard parameter and the decoded image data. However, alternatively, the original parameter may be set in accordance with the decoded image data. In this case, for example, the selector 109 may set the original parameter in accordance with the strength of a high-frequency component of the above-described decoded image data (the magnitude of a change in pixel information). The selector 109 may refer to a change in pixel information within a decoded macroblock and set the original parameter in accordance with the magnitude of the change in the pixel information.

In other words, the selector 109 may set the second parameter (original parameter) in accordance with characteristic information for decoded first frame data (the magnitude of a change in pixel information) calculated from the decoded first frame data (decoded image data).

As described above, the magnitude of a change in the pixel information is information regarding a change in pixel information in each of a plurality of blocks (macroblocks) constituting the first frame data. When the magnitude of the change in the pixel information within a macroblock is large, the selector 109 may set the second parameter (original parameter) such that the strength of smoothing (filtering) is reduced.

In step S709 (first smoothing step), the screen-display filter 108 performs deblocking filtering on the decoded image data received from the compensator 104 using the filter parameter received from the selector 109. In step S710, the screen-display filter 108 outputs the decoded image data subjected to filtering to the image processor 110.

As previously described, the image processor 110 performs image processing, such as color-space transform and processing for improving the image quality, on the decoded image data received from the screen-display filter 108 and outputs the processed image data to the image display 111. The image display 111 displays the image data subjected to image processing received from the image processor 110.

In step S709, when the second parameter is set in step S708, the screen-display filter 108 smoothes the first frame data (decoded image data) using that second parameter and outputs the reproduction first frame data. Here, the second parameter indicates the original parameter, and smoothing indicates filtering.

As described above, in the decoding apparatus according to the present embodiment, the selector 109 selects one of the standard parameter according to the filter strength contained in input movie image data and the original parameter set in the decoding apparatus. The screen-display filter 108 performs deblocking filtering on the decoded image data using the filter parameter set by the selector 109. In addition, the post-filter 106 performs deblocking filtering using the standard parameter. The decoded image data subjected to filtering is stored in the memory 107 as that for use in inter-frame compensation.

In such a way, the excess or deficiency of filtering resulting from the filter strength of a smoothing filter set at the encoding side for movie image data can be compensated for. The filter strength of the smoothing filter adjusted at the decoding side for movie image data can be reflected quickly to an image to be reproduced.

In the present embodiment, when the selector 109 selects the standard parameter, the screen-display filter 108 performs deblocking filtering on the decoded image data using the standard parameter. However, alternatively, when the standard parameter is selected, the decoded image data subjected to deblocking filtering performed by the post-filter 106 may be output to the image processor 110 as that for reproduction.

When the second parameter (original parameter) is not set in the decoding apparatus, the post-filter 106 smoothes (performs filtering on) the first frame data decoded by the compensator 104 using the first parameter (standard parameter) and outputs the obtained frame data as the first frame data for reproduction.

In such a way, processing of the screen-display filter 108 can be omitted.

The selector 109 in the present embodiment is described above primarily with respect to selection of the standard parameter or the original parameter in accordance with the value of the standard parameter obtained from the decoded image data, the macroblock type, the high-frequency component, and other factors. However, alternatively, the selector 109 of the decoding apparatus illustrated in FIG. 1 can also switch a filter parameter in accordance with characteristics of decoded image data subjected to deblocking filtering or an instruction from a user. The selector 109 can also change the original parameter in accordance with characteristics of decoded image data or an instruction from a user. The details are described below in second and subsequent embodiments.

Next, a description is given of a second embodiment of the present invention, focusing on differences from the first embodiment.

In the second embodiment, the case where the original parameter is adjusted in accordance with decoded image data subjected to deblocking filtering is described.

Figure 2:
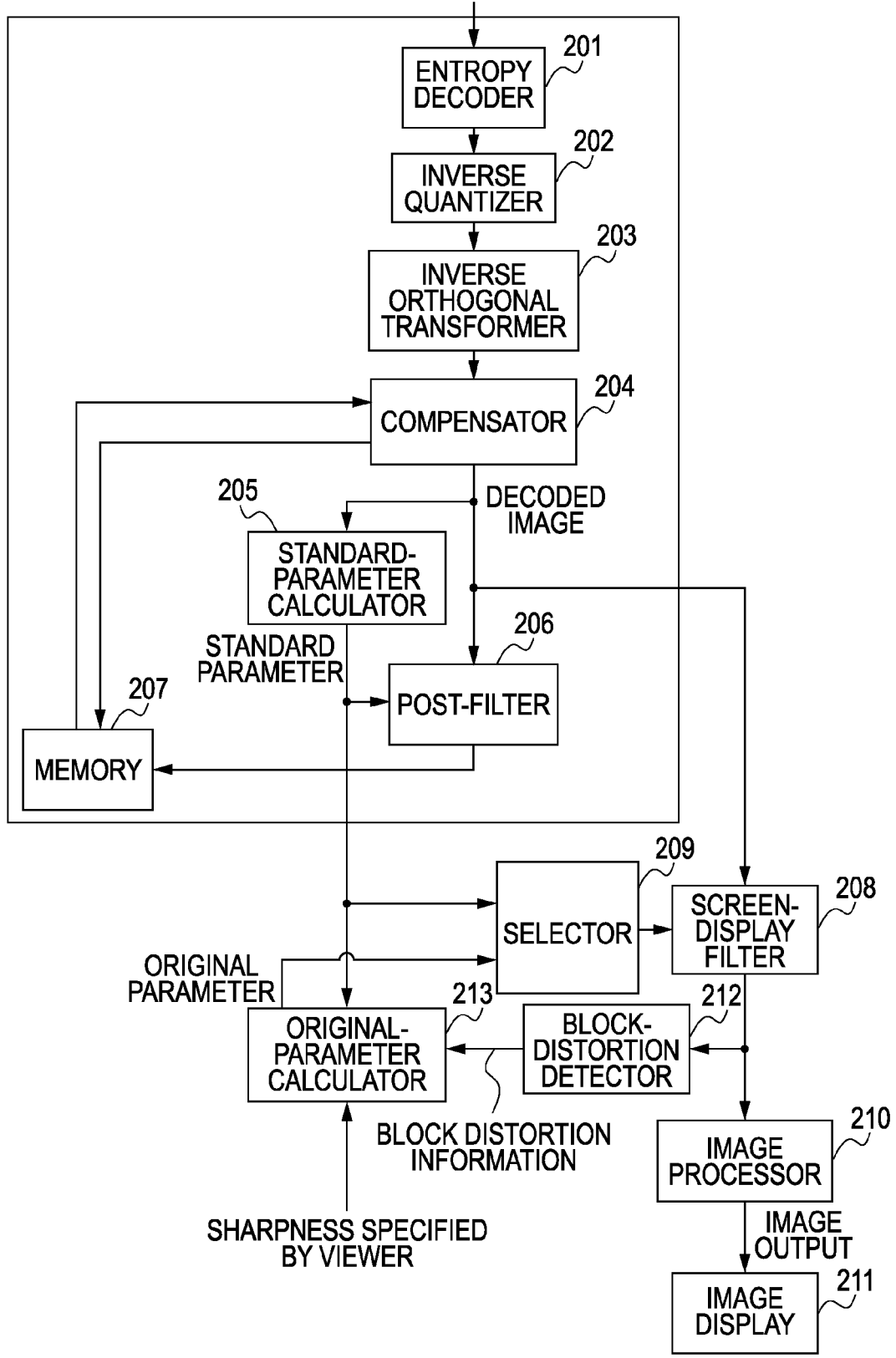
FIG. 2 is a block diagram that illustrates a decoding apparatus according to a second embodiment of the present invention.

FIG. 2 is a block diagram that illustrates a configuration of a decoding apparatus according to the present embodiment. The decoding apparatus illustrated in FIG. 2 includes an entropy decoder 201, an inverse quantizer 202, an inverse orthogonal transformer 203, a compensator 204, a standard-parameter calculator 205, a post-filter 206, and a memory 207. The decoding apparatus illustrated in FIG. 2 further includes a screen-display filter 208, a selector 209, an image processor 210, an image display 211, a block-distortion detector 212, and an original-parameter calculator 213.

The decoding apparatus according to the present embodiment also decodes encoded first frame data, as in the first embodiment. The decoding apparatus decodes encoded second frame data on the basis of information indicating the difference between the first frame data subjected to smoothing (filtering) using a first parameter (standard parameter) and unsmoothed second frame data.

In the present embodiment, the block-distortion detector 212 determines whether block distortion occurs in the decoded image data subjected to deblocking filtering performed by the screen-display filter 208 and outputs the determination as block distortion information to the original-parameter calculator 213.

The original-parameter calculator 213 calculates an original parameter in accordance with the block distortion information output from the block-distortion detector 212 and outputs the original parameter to the selector 209 as the filter parameter for use in decoded image data to be subjected to deblocking filtering later.

The original-parameter calculator 213 sets the second parameter (original parameter) in accordance with characteristics information (block distortion information) for the reproduction first frame data calculated from the reproduction first frame data subjected to smoothing (filtering). The second parameter is for obtaining reproduction second frame data (image data to be decoded later) and is a filter parameter for use in smoothing the second frame data decoded through the entropy decoder 201 to the compensator 204.

One example method for determining whether block distortion occurs in the block-distortion detector 212 is a determination method using the difference between pixel values of pixels at the boundary of blocks of decoded image data subjected to filtering. When receiving decoded image data subjected to deblocking filtering from the screen-display filter 208, the block-distortion detector 212 calculates the difference between two pixel values lying across the boundary of macroblocks in that decoded image data, for example. The block-distortion detector 212 determines that block distortion occurs when the difference between pixel values of pixels at the boundary is within a preset range.

To calculate the difference between pixel values of pixels lying across the boundary with respect to all pixels lying at the boundary of macroblocks, the sum total of differences of pixel values, the maximum value, and the mean value can be used in comparison with a threshold value. When all differences between pixel values lying across the boundary of macroblocks are calculated and those differences are correlated, it may be determined that block distortion occurs. Pixels for use in calculating the difference between pixel values are not limited to two pixels lying across the boundary. A plurality of pixels containing a pixel remote from the boundary may be used as those pixels.

Another example method for determining whether block distortion occurs in the block-distortion detector 212 is a determination method using frequency characteristics in decoded image data subjected to filtering. When receiving the decoded image data subjected to deblocking filtering from the screen-display filter 208, the block-distortion detector 212 determines whether the difference is a pixel change that the image intrinsically has or block distortion by referring to frequency characteristics within a predetermined range (e.g., 32×32 pixels). For example, when the periodicity of occurrence of differences between neighboring pixel values is the same as the periodicity of occurrence of boundaries of macroblocks (16 pixels), it can be determined that block distortion occurs. In other words, even when the difference of pixel values is present in the boundary of macroblocks, if the change of pixel values of the image occurs, for example, for each four pixels, it is determined that block distortion does not occur, i.e., the difference is a pixel change that the image intrinsically has. Alternatively, even when the difference of pixel values is present in the boundary of one or several macroblocks, if the change of pixel values of the image occurs, for example, for each 32 pixels, it is determined that block distortion does not occur, i.e., the difference is a pixel change that the image intrinsically has. As described above, even when the change of pixel values is present at the boundary of macroblocks, if it is determined that the change is a pixel change that the image intrinsically has, non-occurrence of block distortion is determined. In such a way, the likelihood of incorrect determination of occurrence of block distortion that should have been identified as a pixel change that the image intrinsically has can be reduced.

When the block-distortion detector 212 determines that block distortion occurs in the decoded image data subjected to filtering, the original-parameter calculator 213 sets the original parameter such that filtering will be performed more strongly. When it is determined that block distortion does not occur, the original-parameter calculator 213 sets the original parameter such that filtering will be performed weakly.

In other words, when pixel information is changed periodically within first frame data (32×32 pixels), the original-parameter calculator 213 sets the second parameter (original parameter) in accordance with the determination whether the periodic change of the pixel information occurs at the boundary of blocks (macroblocks) constituting the first frame data.

When the original-parameter calculator 213 sets the original parameter in accordance with the block distortion information, the selector 209 selects the original parameter. The original parameter set here can be applied to, for example, from decoded image data (macroblock) that will be subjected to filtering next.

Figure 10:
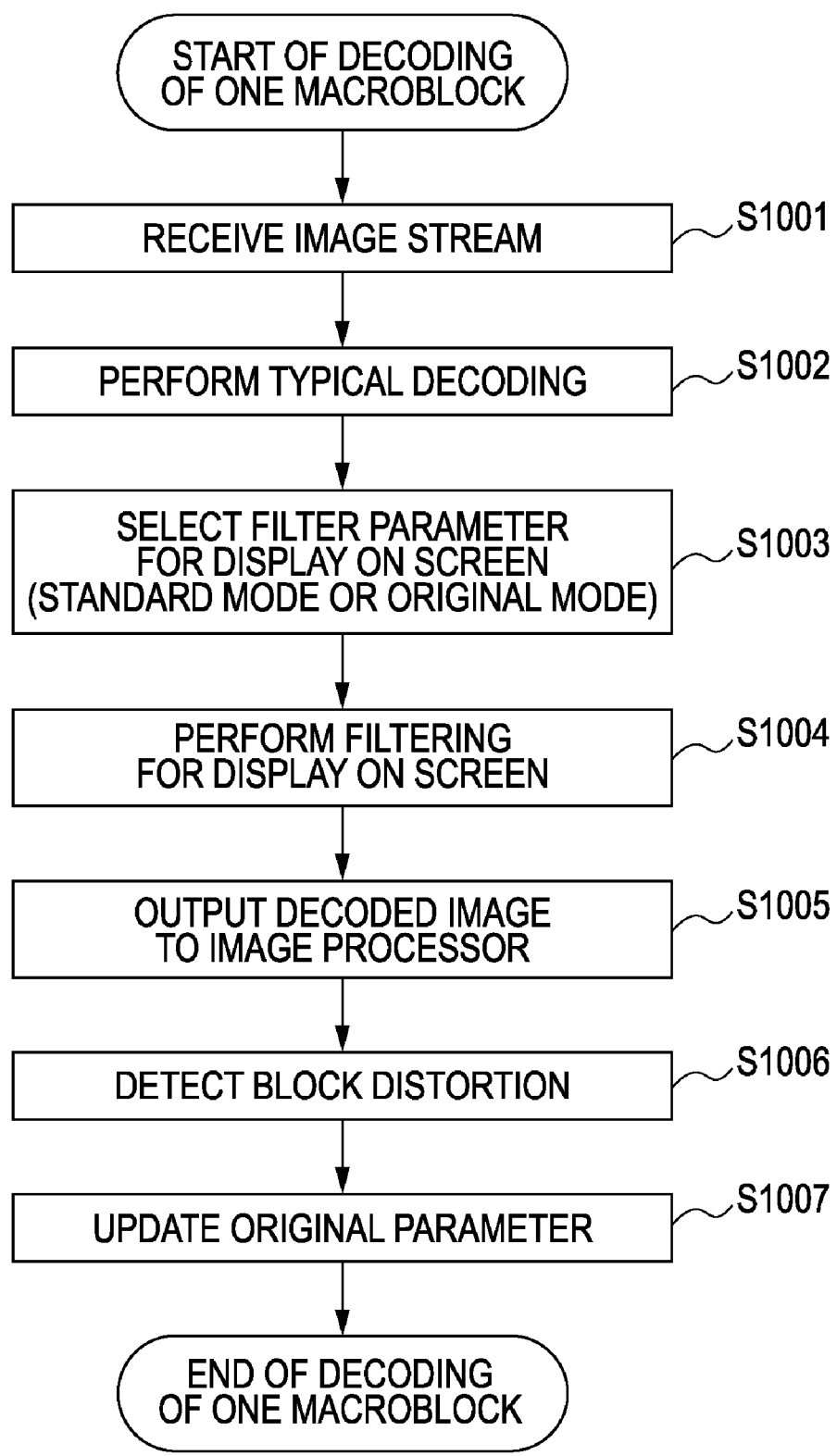
FIG. 10 is a flowchart that illustrates an operation of the decoding apparatus according to the second embodiment.

Next, a process performed in the portions of the decoding apparatus according to the present embodiment from when movie image data is input into the decoding apparatus to when the movie image data is displayed on the image display 211 is described with reference to the flowchart illustrated in FIG. 10.

In the present embodiment, processing in each of the portions is performed by hardware. Alternatively, the processing can also be performed by software. That is, a CPU controlling the decoding apparatus can carry out the functions of each portion by reading a control program stored in a computer-readable storage medium, for example, a ROM to a memory used to execute the program (e.g., a RAM) and performing processing. FIG. 10 and the description below correspond to steps of processing in the decoding apparatus according to the present embodiment when the processing is carried out by software. The processing of steps S1001 to S1005 is substantially the same as the processing of steps S701 to S710 illustrated in FIG. 7, and the description thereof is not repeated here.

In step S1006, the block-distortion detector 212 determines whether block distortion occurs in decoded image data subjected to filtering output from the screen-display filter 208. The block-distortion detector 212 outputs block distortion information indicating the determination to the original-parameter calculator 213. A method for determination whether block distortion occurs is described above. The block distortion information can indicate the degree of occurring block distortion, in addition to the presence or absence of the block distortion. In this case, the original-parameter calculator 213 can calculate the original parameter in accordance with the degree of block distortion.

In step S1007 (setting step), the original-parameter calculator 213 calculates the original parameter based on the block distortion information output in step S1006 and outputs the calculated original parameter to the selector 209. When the original parameter is updated according to the block distortion information, the selector 209 selects the original parameter. The original parameter calculated in step S1007 is used as a parameter in deblocking filtering decoded image data (macroblock) to be decoded subsequently. The original-parameter calculator 213 sets the original parameter such that the filter strength associated therewith is lowest within a range in which a viewer cannot recognize block distortion.

In other words, in step S1007, the original-parameter calculator 213 sets the second parameter (original parameter) in accordance with characteristics information for reproduction first frame data. The characteristics information for the reproduction first frame data described above is calculated from the reproduction first frame data subjected to smoothing (filtering). The second parameter (original parameter) is used in smoothing to obtain reproduction second frame data (image data to be decoded later) and is a filter parameter for use in smoothing (filtering) the decoded second frame data in step S1002.

The original-parameter calculator 213 may also determine the original parameter after referring to sharpness that is preset by a viewer, in addition to the above-described block distortion information. In this case, the image quality suited for preferences of the viewer can be provided.

If the block-distortion detector 212 has an additional function of object recognition (object extraction), degradation in the image quality can be prevented by the setting of weakening deblocking filtering at the boundary of the object.

As described above, the decoding apparatus according to the present embodiment adjusts the original parameter in accordance with the decoded image data subjected to filtering performed by the screen-display filter 208. The post-filter 206 performs deblocking filtering using the standard parameter in accordance with the filter strength contained in the movie image data, and the obtained decoded image data is stored in the memory 207 as that for use in inter-frame compensation.

In such a way, the excess or deficiency of filtering resulting from the filter strength of a smoothing filter set at the encoding side for movie image data can be compensated for. The filter strength of the smoothing filter adjusted at the decoding side for movie image data can be reflected quickly to an image to be reproduced.

Figure 3:
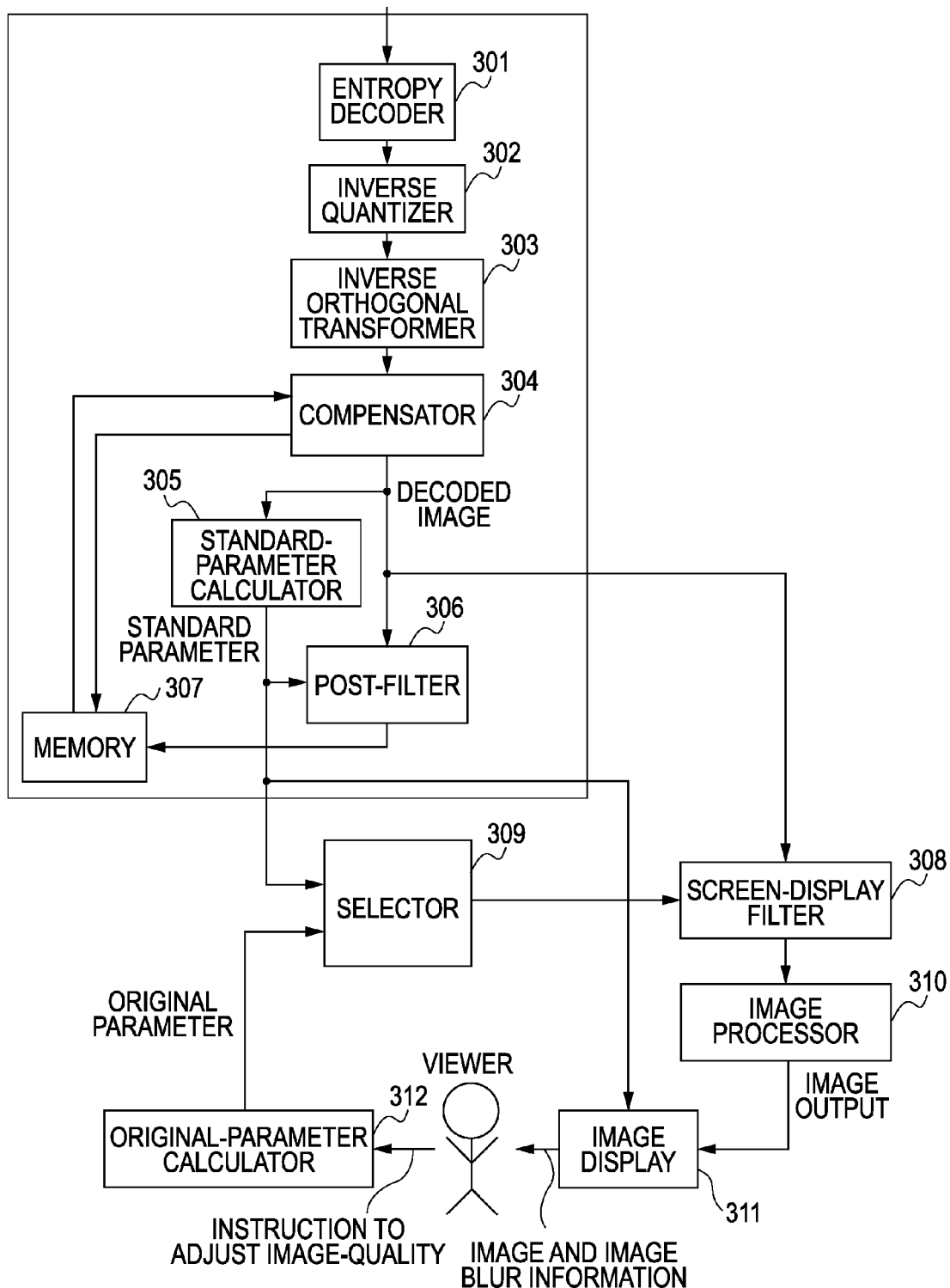
FIG. 3 is a block diagram that illustrates a decoding apparatus according to a third embodiment of the present invention.

Next, a description is given of a third embodiment of the present invention, focusing on differences from the first embodiment. In the third embodiment, the case where the original parameter is adjusted in accordance with an instruction to adjust the image quality from a viewer is described. FIG. 3 is a block diagram that illustrates a configuration of a decoding apparatus according to the present embodiment. The decoding apparatus illustrated in FIG. 3 includes an entropy decoder 301, an inverse quantizer 302, an inverse orthogonal transformer 303, a compensator 304, a standard-parameter calculator 305, a post-filter 306, and a memory 307. The decoding apparatus illustrated in FIG. 3 further includes a screen-display filter 308, a selector 309, an image processor 310, an image display 311, and an original-parameter calculator 312.

The decoding apparatus according to the present embodiment also decodes encoded first frame data, as in the first embodiment. The decoding apparatus decodes encoded second frame data on the basis of information indicating the difference between the first frame data subjected to smoothing (filtering) using a first parameter (standard parameter) and unsmoothed second frame data.

In the present embodiment, the image display 311 displays the status of the standard parameter together with decoded image data subjected to image processing output from the image processor 310.

Figure 4:
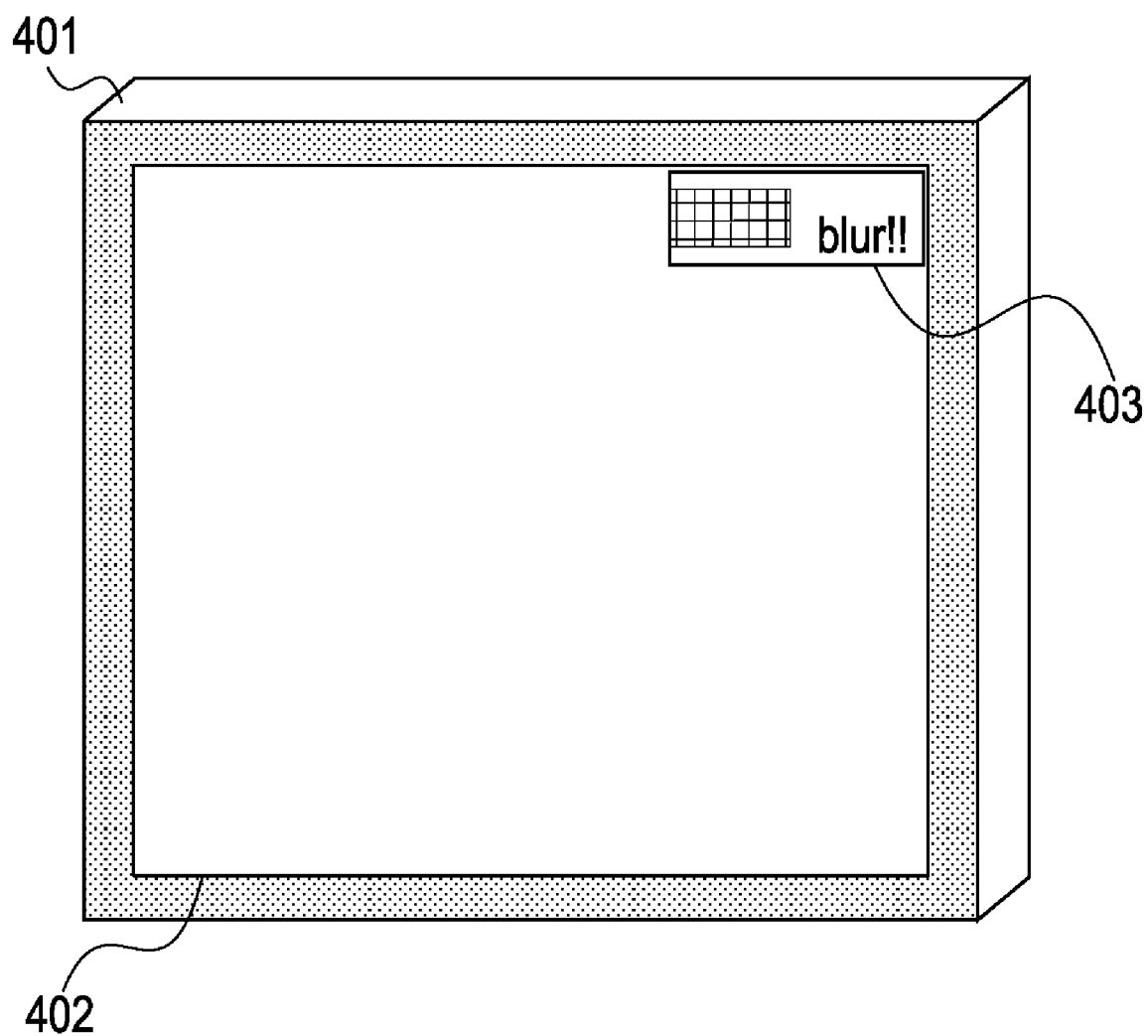
FIG. 4 illustrates an example of a screen that displays image blur information according to the third embodiment.

FIG. 4 illustrates an example in which, in response to selection of the standard parameter by the selector 309, decoded image data subjected to deblocking filtering using the standard parameter and the status of the standard parameter are displayed on a screen. Reference numeral 401 denotes a display apparatus including the decoding apparatus illustrated in FIG. 3. The decoded image data subjected to image processing output from the image processor 310 is displayed by the image display 311 on a display screen 402. Image blur information 403 indicating the status of the standard parameter is also displayed on the display screen 402. The image blur information 403 includes a meter indicating the filter strength corresponding to the standard parameter and a warning message informing the occurrence of image blurring. The image blur information 403 is quantitatively shown as information associated with the content of the image.

In other words, the image display 311 displays information indicating the strength of smoothing (image blur information) and reproduction first frame data.

A viewer recognizes the occurrence of image blurring in a reproduced image caused by filtering using the standard parameter by seeing the meter indicating the filter strength and the reproduced image. The viewer also recognizes that image blurring occurs when the current filter parameter (standard parameter) is used by seeing the warning message. In the present embodiment, both of the meter and the warning message are displayed. However, only one of them may be displayed. In the present embodiment, the meter indicating the filter strength is displayed. However, the meter may indicate a mean value of filter parameters of macroblocks constituting a frame being reproduced.

When the viewer sees an image being reproduced and image blur information and, for example, feels that the image quality is noticeably degraded with the standard parameter, the viewer provides an instruction to adjust the image quality in order to eliminate the image blurring using, for example, a remote controller. In response to the instruction to adjust the image quality from the viewer, the original-parameter calculator 312 calculates the original parameter making the filter strength lower and outputs it to the selector 309.

The selector 309 receives an instruction to change the strength of smoothing. In response to this instruction to change, the selector 309 sets the second parameter. In other words, when the viewer provides the instruction to adjust the image quality, the selector 309 selects the original parameter, instead of the standard parameter.

Figure 11:
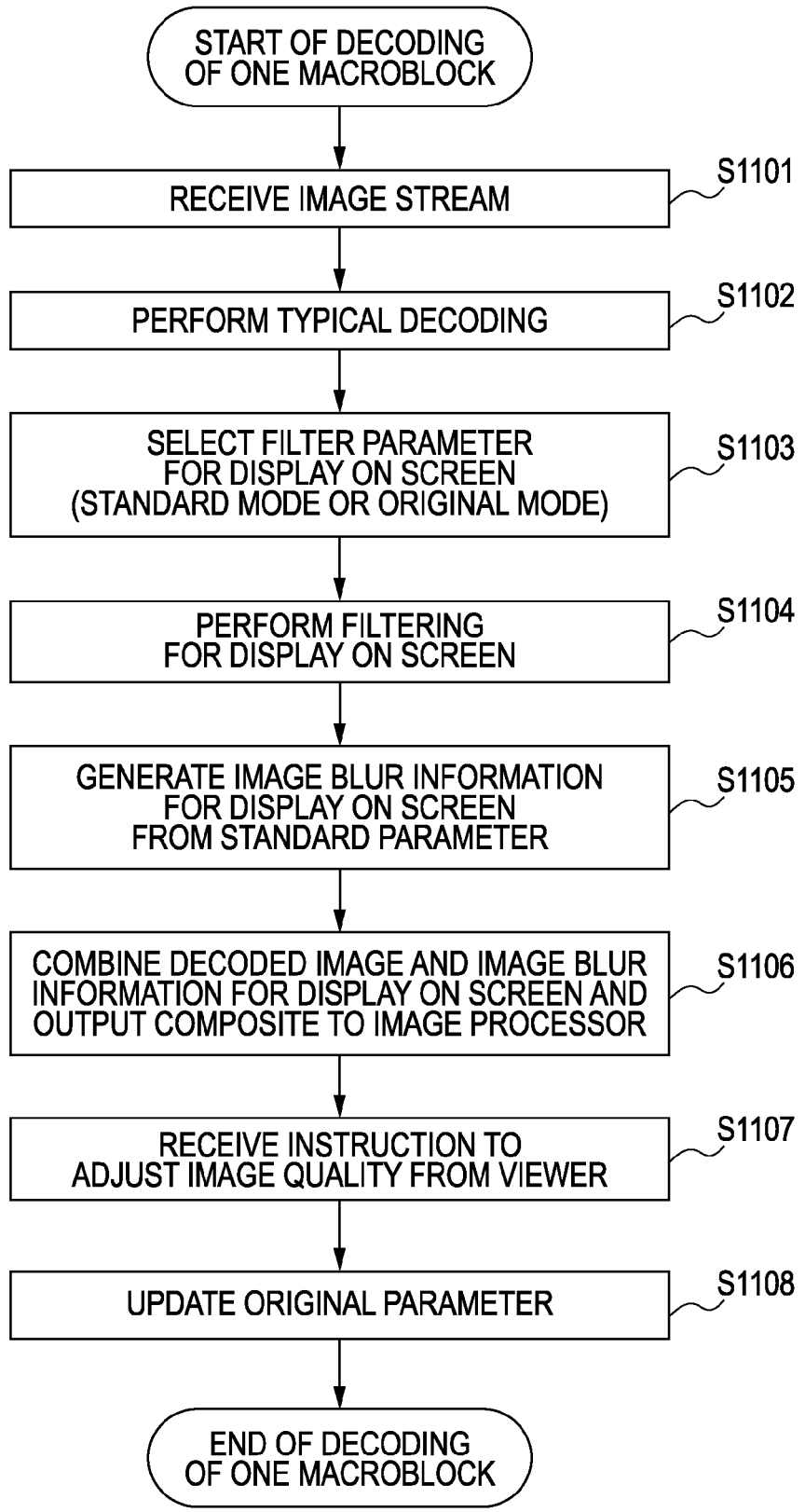
FIG. 11 is a flowchart that illustrates an operation of the decoding apparatus according to the third embodiment.

Next, a process performed in the portions of the decoding apparatus according to the present embodiment from when movie image data is input into the decoding apparatus to when the movie image data is displayed on the image display 311 is described with reference to the flowchart illustrated in FIG. 11.

In the present embodiment, processing in each of the portions is performed by hardware. Alternatively, the processing can also be performed by software. That is, a CPU controlling the decoding apparatus can carry out the functions of each portion by reading a control program stored in a computer-readable storage medium, for example, a ROM to a memory used to execute the program (e.g., a RAM) and performing processing. FIG. 11 and the description below correspond to steps of processing in the decoding apparatus according to the present embodiment when the processing is carried out by software.

The processing of steps S1101 to S1104 is substantially the same as the processing of steps S701 to S709 illustrated in FIG. 7, and the description thereof is not repeated here.

In step S1105, the screen-display filter 308 creates an animation for displaying, as the image blur information 403, the filter strength associated with the standard parameter. The screen-display filter 308 calculates the degree of the occurring image blur. When the calculated degree is higher than a threshold value, the screen-display filter 308 creates an animation for displaying a warning message. Here, information indicating the degree of the occurring image blur can be calculated using, for example, frequency characteristics of decoded image data subjected to filtering. More specifically, for example, the frequency characteristics of the decoded image data subjected to filtering are referred to. When a change in pixel values at the boundary of blocks is determined to be smaller than a change of pixel values that the image intrinsically has, it is determined that image blurring occurs, and the degree of the occurring image blur can be set high. The filter strength can also be used as the information indicating the degree of the occurring image blur. The screen-display filter 308 may create an animation for displaying a warning message when the filter strength is lower than a threshold value.

In step S1106, the screen-display filter 308 combines the image blur information 403 created in step S1105 and the decoded image data subjected to deblocking filtering performed in step S1104 and outputs the composite to the image processor 310. The original-parameter calculator 312 waits for an input of an instruction to adjust the image quality from the viewer.

In step S1107, the original-parameter calculator 312 receives the instruction to adjust the image quality from the viewer, calculates the original parameter in accordance with that instruction, and outputs the calculated original parameter to the selector 309. The selector 309 receives the original parameter and outputs it to the screen-display filter 308. The selector 309 may switch the filter parameter in response to the instruction to adjust the image quality. For example, when the original parameter in which its associated filter strength is lower than the filter strength associated with the standard parameter is preset, the selector 309 may switch the filter parameter.

In step S1108, the screen-display filter 308 receives the original parameter calculated in step S1107 and updates the filter parameter. The filter parameter updated in step S1108 is applied to from decoded image data (macroblock) that will be subjected to filtering next.

In the foregoing description, the standard parameter is displayed as the image blur information 403. When filtering is performed using the original parameter, the filter strength associated with the original parameter can be displayed.

As described above, the decoding apparatus according to the present embodiment displays the image blur information 403 including the meter indicating the filter strength and the warning message indicating that image blurring occurs together with an image being reproduced. The decoding apparatus adjusts the filter strength in response to an instruction to adjust the image quality from a viewer. The decoding apparatus performs deblocking filtering using the standard parameter corresponding to the filter strength contained in movie image data in the post-filter 306 and stores the obtained decoded image data in the memory 307 to allow it to be used in inter-frame compensation.

In such a way, the excess or deficiency of filtering resulting from the filter strength of a smoothing filter set at the encoding side for movie image data can be compensated for. The filter strength of the smoothing filter adjusted at the decoding side for movie image data can be reflected quickly to an image to be reproduced.

Figure 5:
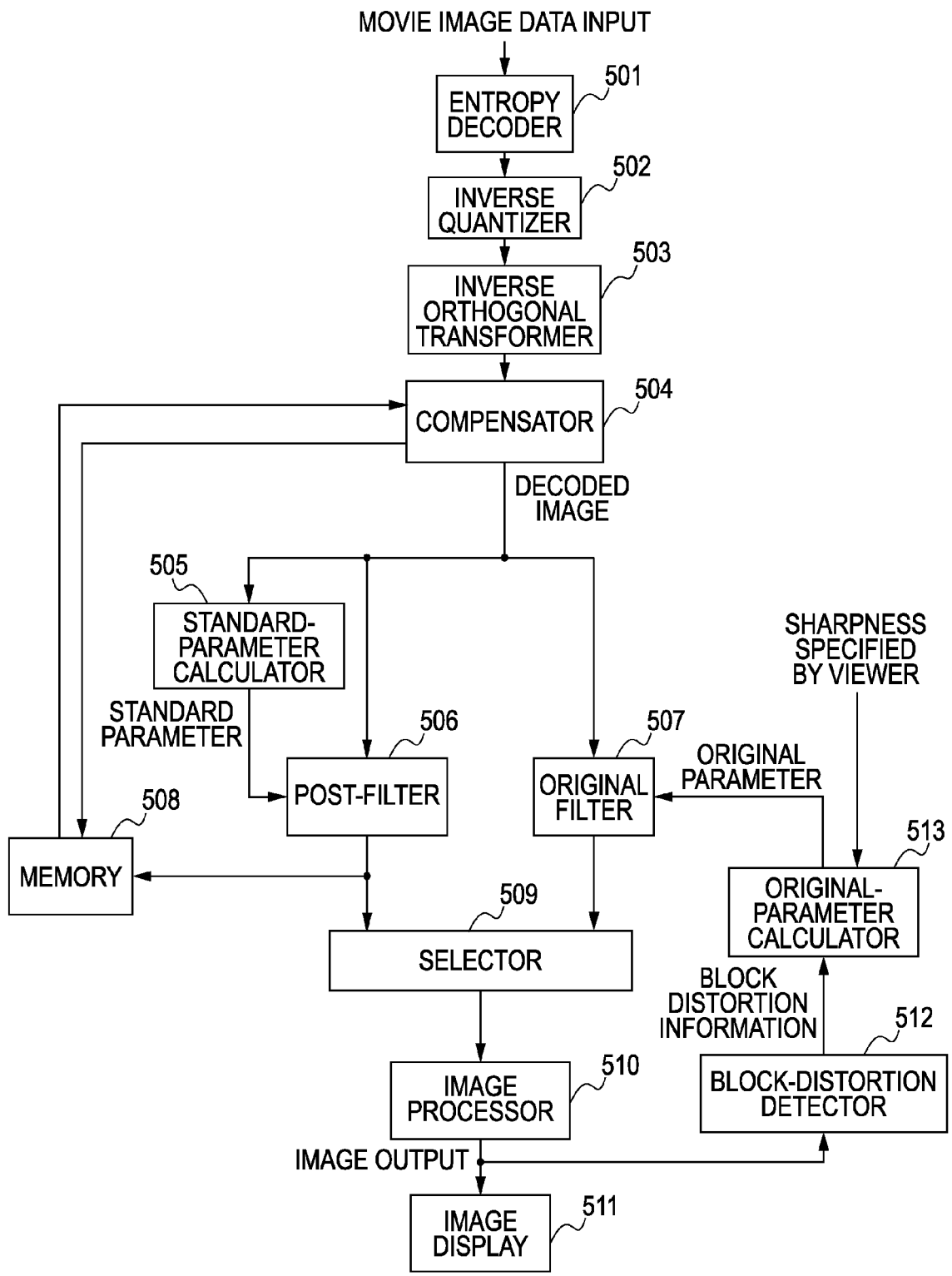
FIG. 5 is a block diagram that illustrates a decoding apparatus according to a fourth embodiment of the present invention.

Next, a description is given of a fourth embodiment of the present invention, focusing on differences from the first embodiment. In the fourth embodiment, the case where the selector selects one of decoded image data subjected to deblocking filtering using the standard parameter and that using the original parameter as image data to be displayed. FIG. 5 is a block diagram that illustrates a configuration of a decoding apparatus according to the present embodiment.

The decoding apparatus illustrated in FIG. 5 includes an entropy decoder 501, an inverse quantizer 502, an inverse orthogonal transformer 503, a compensator 504, a standard-parameter calculator 505, a post-filter 506, an original filter 507, and a memory 508. The decoding apparatus illustrated in FIG. 5 further includes a selector 509, an image processor 510, an image display 511, a block-distortion detector 512, and an original-parameter calculator 513.

The decoding apparatus according to the present embodiment also decodes encoded first frame data, as in the first embodiment. The decoding apparatus decodes encoded second frame data on the basis of information indicating the difference between the first frame data subjected to smoothing (filtering) using a first parameter (standard parameter) and unsmoothed second frame data.

In the present embodiment, an operation of the original-parameter calculator 513 is substantially the same as that of the original-parameter calculator of each of the second and third embodiments. The original filter 507 performs deblocking filtering using the original parameter and outputs the decoded image data subjected to filtering to the selector 509. The post-filter 506 performs deblocking filtering on the decoded image data using the standard parameter calculated by the standard-parameter calculator 505 and outputs the decoded image data subjected to filtering to the selector 509. The selector 509 selects one of the output subjected to filtering using the standard parameter from the post-filter 506 and the output subjected to filtering using the original parameter from the original filter 507 and outputs the selected image data to the image processor 510 as that to be reproduced.

Figure 12:
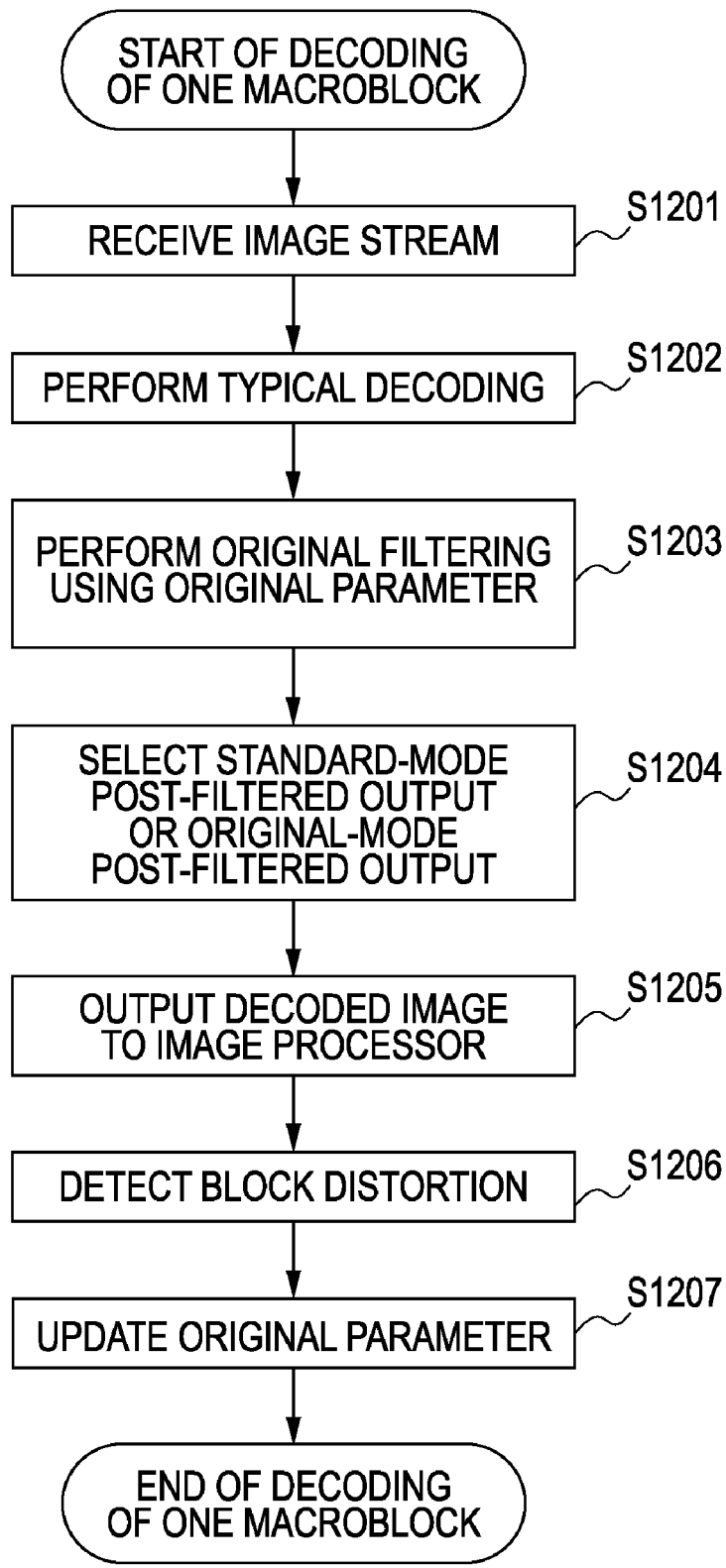
FIG. 12 is a flowchart that illustrates an operation of the decoding apparatus according to the fourth embodiment.

Next, a process performed in the portions of the decoding apparatus according to the present embodiment from when movie image data is input into the decoding apparatus to when the movie image data is displayed on the image display 511 is described with reference to the flowchart illustrated in FIG. 12.

In the present embodiment, processing in each of the portions is performed by hardware. Alternatively, the processing can also be performed by software. That is, a CPU controlling the decoding apparatus can carry out the functions of each portion by reading a control program stored in a computer-readable storage medium, for example, a ROM to a memory used to execute the program (e.g., a RAM) and performing processing. FIG. 12 and the description below correspond to steps of processing in the decoding apparatus according to the present embodiment when the processing is carried out by software.

The processing of steps S1201 and S1202 is substantially the same as the processing of steps S701 to S707 illustrated in FIG. 7, and the description thereof is not repeated here. In step S1203, the original filter 507 performs deblocking filtering on the decoded image data using the original parameter calculated by the original-parameter calculator 513.

In step S1204, the selector 509 selects one of the decoded image data subjected to filtering using the standard parameter and that using the original parameter as image data to be displayed. One example of selection performed by the selector 509 is selection based on block distortion information indicating block distortion of each decoded image data subjected to filtering detected by the block-distortion detector 512. The block distortion information is described above in the second embodiment. Another example is selection by a viewer using a remote controller in accordance with image blur information displayed on the display screen. The image blur information is described above in the third embodiment. The above-described selecting ways may be combined. For example, the image display 511 may display the image blur information together with the decoded image data subjected to filtering. The selector 509 may select the decoded image data to be displayed in accordance with the block distortion information unless an instruction to adjust the image quality is input from the user. When an instruction to adjust the image quality is input from the user, the selector 509 may select the decoded image data to be displayed in response to the instruction. In such a manner, the selector 509 can select decoded image data subjected to filtering to be displayed using various methods.

In step S1205, the selector 509, which makes selection in step S1204, outputs the decoded image data to be displayed to the image processor 510. The image processor 510 receives the decoded image data and performs image processing on it. The image display 511 displays the image.

In step S1206, the block-distortion detector 512 detects block distortion in the decoded image data output from the image processor 510 and outputs the block distortion information to the original-parameter calculator 513. A method for detecting block distortion is described above in the second embodiment.

In step S1207, the original-parameter calculator 513 calculates the original parameter in accordance with the block distortion information output in step S1206. The original-parameter calculator 513 outputs the calculated original parameter to the original filter 507. The original filter 507 updates the original parameter.

Figure 6:
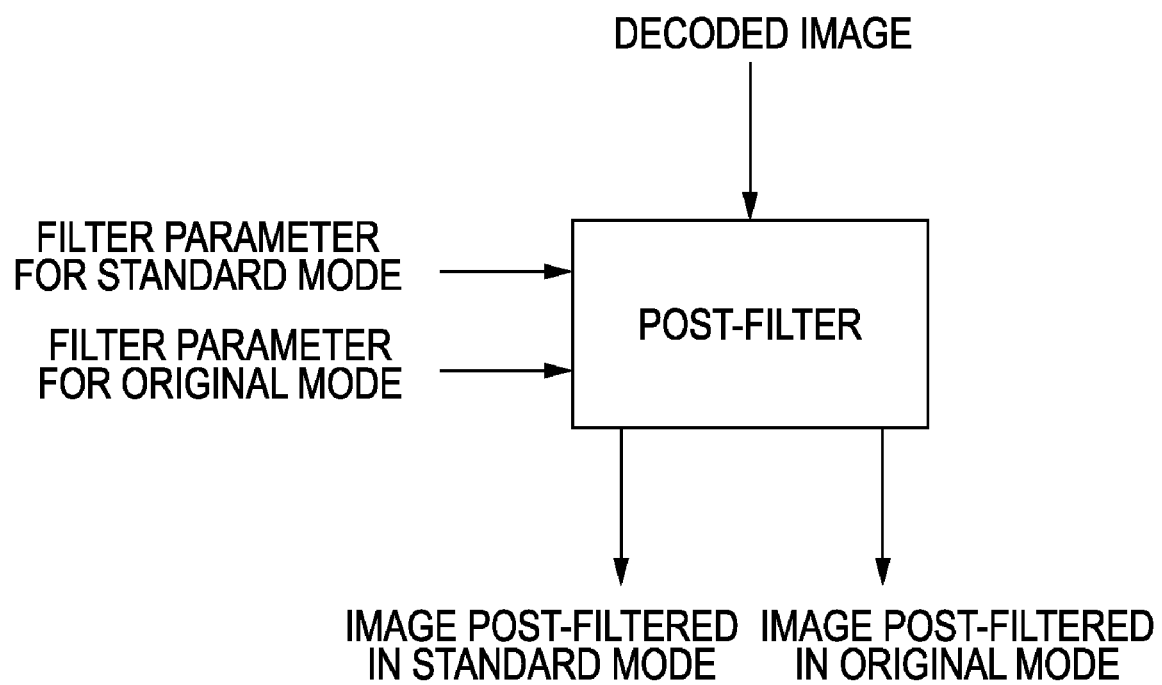
FIG. 6 illustrates sharing of filter hardware according to the fourth embodiment.

The two filters in the present embodiment can share a large amount of hardware. This is because filtering operations having different filtering advantages are performed in parallel with one another in the post-filter 506. Accordingly, as illustrated in FIG. 6, a configuration that outputs two types of decoded images using two kinds of parameters can be provided.

As described above, in the present embodiment, the selector 509 selects one of decoded image data subjected to deblocking filtering using the standard parameter and that using the original parameter as image data to be displayed. The post-filter 506 performs deblocking filtering using the standard parameter and stores the obtained decoded image data in the memory 508 to allow it to be used in inter-frame compensation.

In such a way, the excess or deficiency of filtering resulting from the filter strength of a smoothing filter set at the encoding side can be compensated for. The filter strength of the smoothing filter adjusted at the decoding side for movie image data can be reflected quickly to an image to be reproduced.

In the above embodiments, deblocking filtering is performed on a macroblock basis. However, deblocking filtering may be performed on another basis.

Varying combinations of elements described in the second to fourth embodiments can be used in setting an original parameter, selecting a filter parameter, and selecting decoded image data subjected to filtering.

In the above embodiments, the case is described where the encoding system H.264 is used. However, the present invention is not limited to this case. For example, the present invention is also applicable to an encoding system that performs post-filtering, such as VC-1 or AVS.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-135682 filed May 23, 2008, which is hereby incorporated by reference herein in its entirety.

What is claimed is:

1. A decoding apparatus for decoding encoded first frame data and decoding encoded second frame data on the basis of difference information indicating a difference between reference first frame data using a first parameter and unsmoothed second frame data, the decoding apparatus comprising:
   a decoding unit configured to decode the encoded first frame data;
   a first smoothing unit configured to, when the decoding apparatus sets a second parameter, perform smoothing using the second parameter on the first frame data decoded by the decoding unit and output a smoothed first frame data as reproduction first frame data to be reproduced; and
   a second smoothing unit configured to perform smoothing using the first parameter on the first frame data decoded by the decoding unit and output the smoothed first frame data as reference first frame data for use in reference in decoding the encoded second frame data,
   wherein the decoding unit is configured to refer to the reference first frame data, which is obtained by smoothing using the first parameter performed by the second smoothing unit, and decode the encoded second frame data on the basis of the difference information indicating the difference between the first frame data subjected to smoothing using the first parameter and the unsmoothed second frame data.

2. The decoding apparatus according to claim 1, wherein each of the first and second smoothing units is configured to perform smoothing on pixel information for pixels at a boundary between a plurality of blocks constituting the first frame data.

3. The decoding apparatus according to claim 1, further comprising a setting unit configured to set the second parameter in accordance with characteristics information for the decoded first frame data, the characteristics information being calculated from the decoded first frame data.

4. The decoding apparatus according to claim 1, further comprising a setting unit configured to set the second parameter for use in smoothing the second frame data decoded by the decoding unit, the smoothing being performed by the second smoothing unit to obtain reproduction second frame data to be reproduced, in accordance with characteristics information for the reproduction first frame data, the characteristics information being calculated from the reproduction first frame data.

5. The decoding apparatus according to claim 1, further comprising a setting unit configured to set the second parameter such that, when a change in pixel information for each of a plurality of blocks constituting the first frame data is large, strength of the smoothing is reduced.

6. The decoding apparatus according to claim 1, further comprising a setting unit configured to set the second parameter in response to a determination of whether, when pixel information periodically changes within the first frame data, the periodic change in the pixel information occurs at a boundary between a plurality of blocks constituting the first frame data.

7. The decoding apparatus according to claim 1, further comprising:
   a display control unit configured to display strength of the smoothing and the reproduction first frame data;
   a receiving unit configured to receive an instruction to change the strength of the smoothing; and
   a setting unit configured to set the second parameter in response to the received instruction.

8. The decoding apparatus according to claim 1, wherein the second smoothing unit is configured to, when the second parameter is not set in the decoding apparatus, output frame data obtained by performing smoothing using the first parameter on the first frame data decoded by the decoding unit as the reproduction first frame data.

9. A decoding method for use in a decoding apparatus for decoding encoded first frame data and decoding encoded second frame data on the basis of difference information indicating a difference between reference first frame data using a first parameter and unsmoothed second frame data, the decoding method comprising:
   a decoding step of decoding the encoded first frame data;
   a first smoothing step of, when the decoding apparatus sets a second parameter, performing smoothing using the second parameter on the first frame data decoded in the decoding step and outputting a smoothed first frame data as reproduction first frame data to be reproduced; and
   a second smoothing step of performing smoothing using the first parameter on the first frame data decoded in the decoding step and outputting the smoothed first frame data as reference first frame data for use in reference in decoding the encoded second frame data,
   wherein, in the decoding step, the reference first frame data, which is obtained by smoothing using the first parameter performed in the second smoothing step, is referred to and the encoded second frame data is decoded on the basis of the difference information indicating the difference between the first frame data subjected to smoothing using the first parameter and the unsmoothed second frame data.

10. A computer-readable storage medium storing a computer-executable process, the computer-executable process causing a computer to execute a method of decoding encoded first frame data and decoding encoded second frame data on the basis of difference information indicating a difference between reference first frame data using a first parameter and unsmoothed second frame data, the method comprising:
   a decoding step of decoding the encoded first frame data;
   a first smoothing step of, when the decoding apparatus sets a second parameter, performing smoothing using the second parameter on the first frame data decoded in the decoding step and outputting the smoothed first frame data as reproduction first frame data to be reproduced; and
   a second smoothing step of performing smoothing using the first parameter on the first frame data decoded in the decoding step and outputting the smoothed first frame data as reference first frame data for use in reference in decoding the encoded second frame data, wherein, in the decoding step, the reference first frame data, which is obtained by smoothing using the first parameter performed in the second smoothing step, is referred to and the encoded second frame data is decoded on the basis of the difference information indicating the difference between the first frame data subjected to smoothing using the first parameter and the unsmoothed second frame data.

* * * * *